United States Patent
Luebbering et al.

Patent Number: 6,055,511
Date of Patent: Apr. 25, 2000

[54] COMPUTERIZED INCENTIVE COMPENSATION

[75] Inventors: Charles L. Luebbering; Wayne E. Hall, both of Tucson, Ariz.

[73] Assignee: Breault Research Organization, Inc., Tucson, Ariz.

[21] Appl. No.: 09/201,265

[22] Filed: Nov. 30, 1998

[51] Int. Cl.⁷ .................................................. G06F 17/60
[52] U.S. Cl. .................... 705/14; 705/7; 705/8; 705/9; 705/11; 705/32; 235/376; 235/378
[58] Field of Search .............. 705/8, 9, 11, 14, 705/32, 7; 235/376, 378

[56] References Cited

U.S. PATENT DOCUMENTS

| | | | |
|---|---|---|---|
| 4,791,561 | 12/1988 | Huber | 707/1 |
| 5,819,231 | 10/1998 | Tremaine | 707/7 |
| 5,819,251 | 10/1998 | Kremer et al. | 707/1 |
| 5,873,088 | 2/1999 | Hayashi et al. | 707/100 |
| 5,966,695 | 10/1999 | Melchione et al. | 705/10 |
| 5,974,418 | 10/1999 | Blinn et al. | 707/100 |

OTHER PUBLICATIONS

Ellig, Bruce "Incentive Plans: Short–Term Design Issues" Compensation Review, 1984, v16n3, pp. 26–36 (abstract), [retrieved on Dec. 08, 1999], retrieved from Dialog Information Services, Palo Alto, CA USA Accession No. 84–30538.

Elvira, Marta The design and outcomes of reward structures: integrating agency and power explanations of incentives (promotions, employee wages, compensation), 1995, p. 1217 (dissertation), [retrieved on Dec. 08, 1999], retrieved from vol. 57/03–A of Dissertation Abstracts International, Order No. AADAA–I9621125.

*Primary Examiner*—James P. Trammell
*Assistant Examiner*—Chinor M. Lee
*Attorney, Agent, or Firm*—Paul F. Wille

[57] ABSTRACT

A computer is programmed to implement an incentive compensation plan by obtaining existing data on employees and business activities, evaluating the profitability of the activities, and indicating what amounts should be paid to existing employees based upon criteria defined by management in accordance with existing business conditions.

6 Claims, 4 Drawing Sheets

40

CONTRACT INFORMATION

Job No. ▭ ~ 41
Company ▭ ~ 42
Date signed ▭ ~ 43
Description ▭ ~ 44

Profit Cap ▭ 47  CIP Pct. ▭ 48  DIP Pct. ▭ 49

Revenue History  45   Employees Assigned  46

EMPLOYEE INFORMATION

SSN. ▭ — — ~ 51
Name ▭ ~ 52
Date hired ▭ ~ 53
Address ▭ ~ 54

Birth Date ▭ 55   Salary ▭ 56   Status ▭ 57

Full Time ☑ ~ 58
Part Time ☐
EE signed ☑ ~ 59

FIG. 5

COMPUTERIZED INCENTIVE COMPENSATION

BACKGROUND OF THE INVENTION

This invention relates to incentive compensation plans and, in particular, to a computerized incentive compensation plan that is easily implemented and administered.

Employee compensation has almost become a business in itself as corporations try to find innovative and effective ways to compensate employees and provide incentive for further superior performance. Many or all of these plans are subject to government scrutiny because the plans involve stocks, retirement accounts, or some form of deferred compensation in an attempt to minimize the tax consequences of the plan.

Another difficulty with many plans is simply the infinitely variable market conditions that may occur. A plan that is reasonable and effective at the time it was implemented can become wholly inadequate under different economic conditions, e.g. lower interest rates. On the other hand, a plan might equally well become far too generous to the employee, and economically burdensome for a company, under other market conditions. Particularly in the latter situation, it is awkward for a company to change plans once a commitment has been made to a particular plan. Further, it is often quite expensive to design and implement a new plan.

Deferred compensation is, in effect, deferred incentive. It is desired that the payment occur relatively soon after the activity being recognized and rewarded. Another problem with deferred compensation is that an employee can get into a position where the deferred compensation is greater than the employee's current salary. That is, the employee almost has an incentive to leave the company.

Many incentive compensation plans favor individual or direct contributors whereas other plans try to compensate indirect contributors but, in the process, provide insufficient recognition to the direct contributor. It is desired to recognize both direct and indirect contributors.

Many incentive compensation plans are complicated to implement and are administratively burdensome. Preferably a plan could be implemented using existing software, using existing data, and would require as little maintenance, e.g. data entry, as possible. By "existing data" is meant data already in one or more data banks within a company, such as payroll and accounting.

There are many software programs in the prior art that can be customized for a particular purpose by creating and executing "scripts," i.e. short programs written in a high level language that is interpreted by the parent or host program. A script is different from "macro" in that a macro is a series of keystrokes automatically entered when a particular code key or key sequence is depressed. A script is a series of instructions, including conditional instructions, not keystrokes. Database programs such as "Access" and "FileMaker" have scripting capability and provide many other features that enable a user to construct sophisticated, customized programs.

In view of the foregoing, it is therefore an object of the invention to provide a computerized incentive compensation program that can be implemented using existing software and existing data.

Another object of the invention is to provide a computerized incentive compensation program that communicates with existing programs to minimize data entry.

A further object of the invention is to provide an incentive compensation program that is relatively free of government regulation.

Another object of the invention is to provide an incentive compensation program that recognizes both direct and indirect contribution to success for promoting business growth and retaining key employees.

SUMMARY OF THE INVENTION

The foregoing objects are achieved in this invention in which a computer is programmed to implement an incentive compensation plan by obtaining existing data on employees and business activities, evaluating the profitability of the activities, and indicating what amounts should be paid to existing employees based upon criteria defined by management in accordance with existing business conditions.

BRIEF DESCRIPTION OF THE DRAWINGS

A more complete understanding of the invention can be obtained by considering the following detailed description in conjunction with the accompanying drawings, in which:

FIG. 4 represents a computer screen displaying contract information in an employee compensation program constructed in accordance with the invention;

FIG. 5 represents a computer screen displaying employee information in an employee compensation program constructed in accordance with the invention.

DETAILED DESCRIPTION OF THE INVENTION

A database includes a plurality of records. Each record includes a plurality of fields storing specific information. For example, a person's address may be contained in a single field or broken into several fields, e.g. separately storing name, street address, city, state, and zip code. Other information is stored in additional fields. The fields may or may not all be displayed simultaneously. Typically, fields are arranged in one or more layers, with only one layer from each record being visible at a time.

Figure 1:
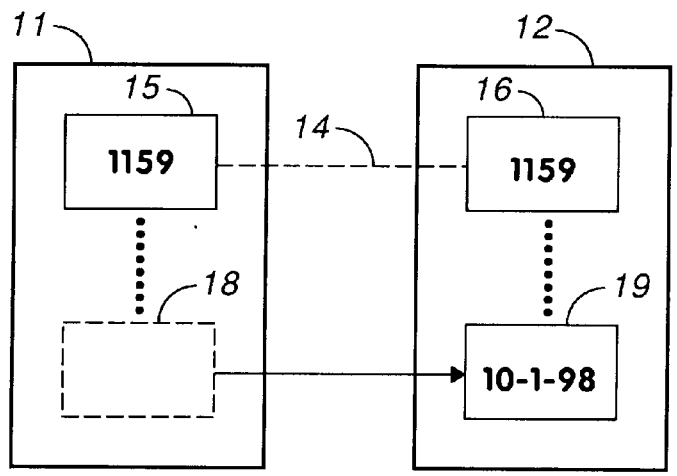
FIG. 1 illustrates the concept of a relational database.

In FIG. 1, database 11 is the master file and database 12 is the related file in a relational database system. Databases 11 and 12 are stored in the same computer or are stored in separate computers and linked by a network. A relational database system allows data from the related file to be viewed, edited, and used in the master file without being copied to the master file.

In a relational database system, the master file and the related file must have at least one field in common for each record. As indicated by dashed line 14, field 15 in database 11 and field 16 in database 12 are the common fields uniquely identifying each record. Once the link is established between database 11 and database 12, one can work in field 18 of database 11 with data from field 19 in database 12 as though the data were actually stored in database 11. The result is a significant reduction in the storage space required for related data because the data does not have to be duplicated for each intended use.

Figure 2:
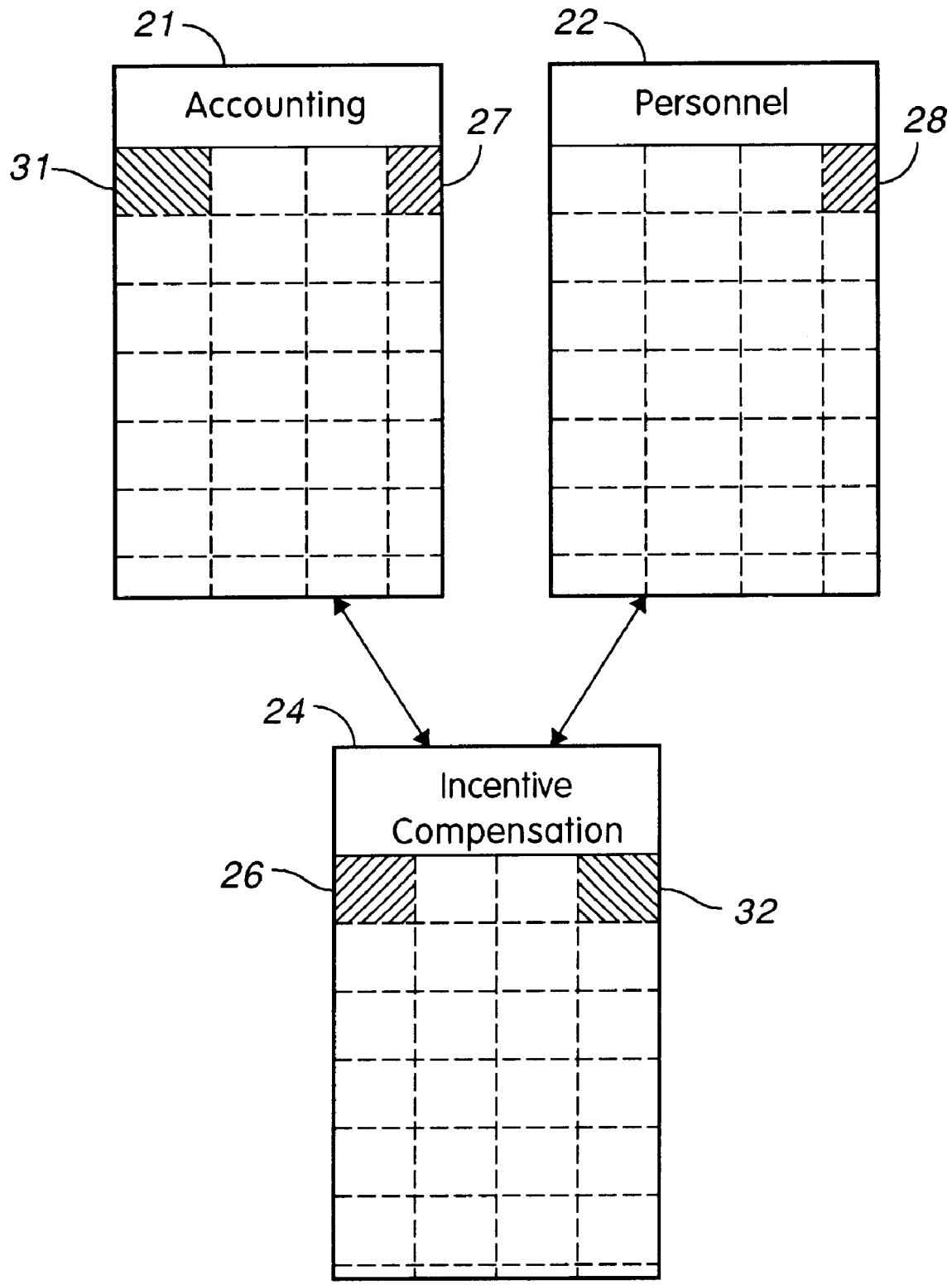
FIG. 2 represents a memory map for data used in implementing the invention.

The computerized incentive compensation program of the invention operates like a relational database to minimize and simplify the installation and operation of the program. FIG. 2 illustrates databases linked in accordance with the invention. Except for a very small company or a very new company, accounting database 21 and personnel database 22 are assumed to be in existence and used for purposes other than the invention. In FIG. 2, each row represents a record in a database and each column represents the fields within the records.

Incentive compensation database 24 includes at least one match field, such as field 26 for linking with database 21 and database 22. For example, an employee's Social Security number, name, or some other unique identification could be used instead. In database 21, field 27 contains the same data as field 26. Similarly, in database 28, field 28 contains the same data as field 26. Thus, database 24 is linked to database 21 and database 22.

The same match field need not be used for both related databases. For example, in accounting database 21, the match field could be field 31 and contain a unique contract number or job number associated with a particular project. Each record in incentive compensation database 24 correlates employee names and project numbers, linking with personnel database 22 by employee identification number.

Figure 3:
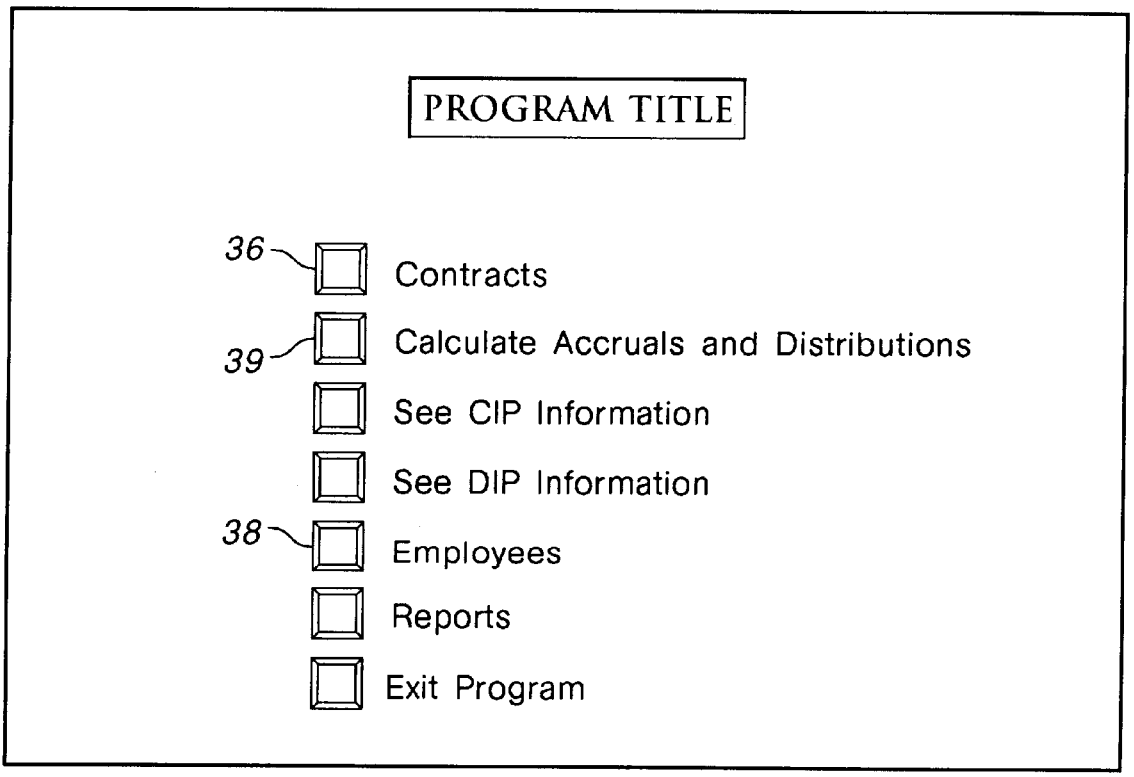
FIG. 3 represents an opening screen of a computerized employee compensation plan constructed in accordance with the invention.

FIG. 3 represents the opening screen of a computer programmed in accordance with the invention. Although database programs such as "Access" and "FileMaker" can be used to implement the invention, a custom program could be used instead. The invention is described herein as though a database program is used.

As illustrated in FIG. 3, the opening screen is the first of several layers and contains no fields, only "buttons", such as buttons 36, 38, and 39, for navigating among the layers. The pull down menus of the database program can be hidden or displayed, as desired.

Depressing button 36 moves to the layer illustrated in FIG. 4. In FIG. 4, contract layer 40 includes data from other sources, displayed as though the data were stored locally. The data is preferably not modifiable to assure the integrity of the data. Fields 41, 42, 43, 44, and 45 contain data from accounting. Field 46 contains data from personnel files. Profit cap field 47 requires the entry of data by the user and is the threshold amount by which income exceeds expenses to trigger incentive compensation. In one embodiment of the invention, this amount was $5,000. The field can be defined to automatically enter this amount when each new record is created and the amount can be over-written at any time. Expenses includes all direct costs and overhead.

Field 48 contains the percent of the excess available for the contract incentive pool, i.e. the money that is apportioned among all employees. The apportionment can be per capita or determined in a more complicated manner, e.g. dependent upon base salary and length of service. In a preferred embodiment of the invention, the distribution is proportional to the base salary of each employee who was an employee on the date that the contract was signed. There are two factors at work here: employment on a certain date and the base salary or base pay on that date. In a preferred embodiment of the invention, twenty percent of the excess is set aside for distribution among employees.

Field 49 contains the percent of the excess available for the discretionary incentive pool. In one embodiment of the invention, this was set at ten percent. The discretionary incentive pool is the amount that can be paid to one or more individual contributors, whether or not the contributors are identified in field 46. The discretionary pool enables recognition of "rainmakers", the people who attract business even if they do not work on a particular project.

Depressing button 38 (FIG. 3) moves to the layer illustrated in FIG. 5. In FIG. 5, employee layer 50 includes data from other sources, displayed as though the data were stored locally. The data is preferably not modifiable to assure the integrity of the data. Fields 51, 52, 53, 54, 55, and 56 contain data from personnel. Field 57 contains data from accounting files. Check box 58 is checked, indicating that the employee, if otherwise qualified, will receive a full share rather than a partial share as a part-time employee.

Check box 59 indicates that the employee signed the employment agreement covering the incentive compensation plan. If check box 59 were not checked, an employee would not share under the plan, even if he were a direct contributor to a project and were listed in box 46 (FIG. 4).

Once a project qualifies and an employee qualifies, payments are made periodically, e.g. quarterly, until income from a project ceases or employment is terminated. A record for payment is sent to accounting, where payment is made, less appropriate withholdings for federal tax, state tax, social security, and other requirements. Button 39 (FIG. 3) triggers the calculations and the communication with accounting for appropriate accruals and for payment.

Figure 6:
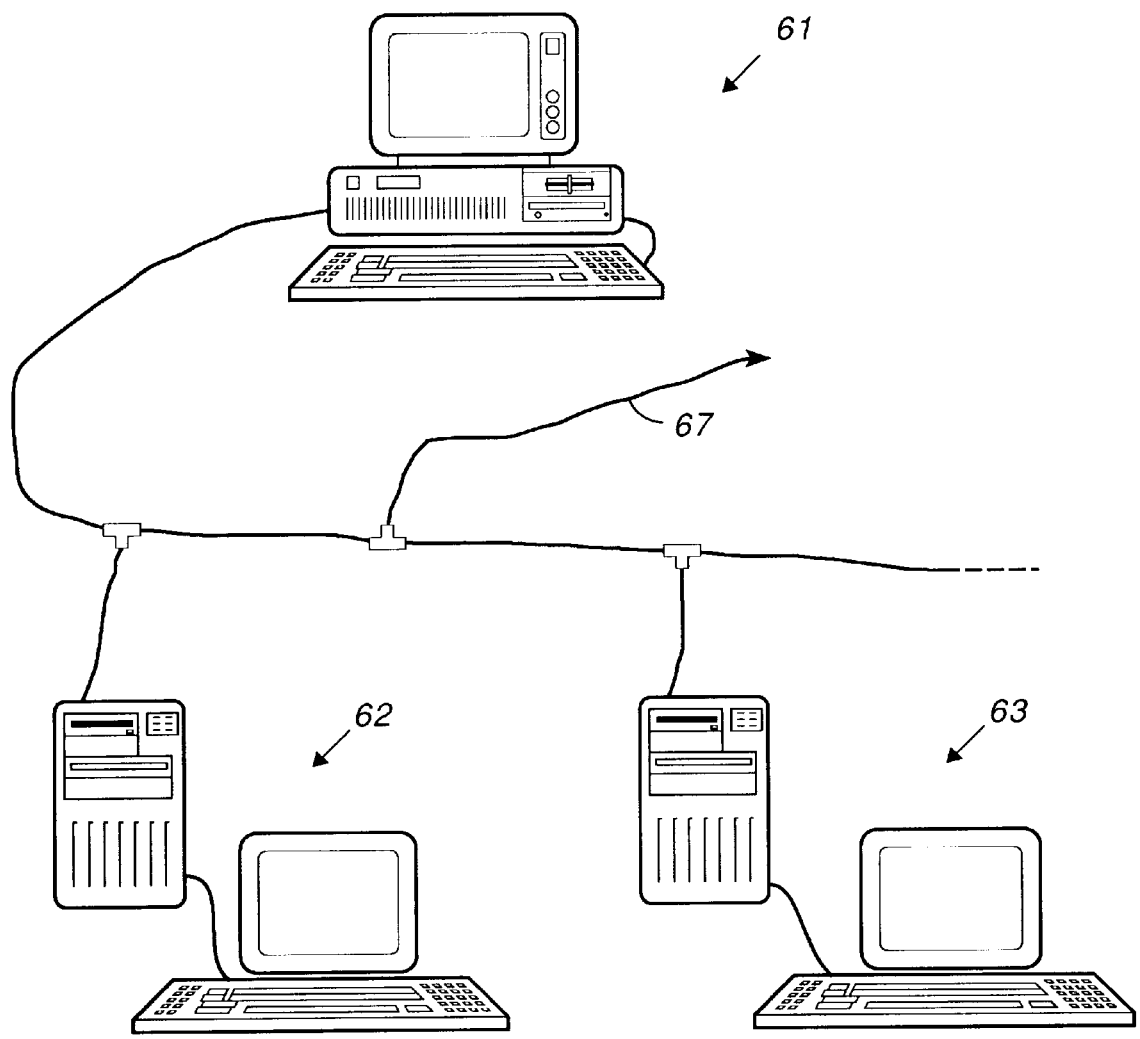
FIG. 6 illustrates a computer system for implementing the invention.

FIG. 6 illustrates apparatus for implementing the invention. The apparatus includes computer systems 61, 62, and 63 interconnected by local area network 65. Line 67 represents a connection to a server or another network. Each computer system includes RAM, ROM, mass storage such as hard disk, CPU, I/O including a modem or network interface card, video board, keyboard, and display. The incentive compensation program, implemented as a relational database running on computer system 61, communicates with computer system 62, which contains accounting data, and with computer system 63, which contains personnel data. All the data could be stored and manipulated in a single computer, if desired.

The invention thus provides a computerized incentive compensation program that can be implemented using existing software and existing data and that communicates with existing programs to minimize data entry. The program provides incentives for both direct and indirect contributions to success and is relatively free of government regulation.

Having thus described the invention, it will be apparent to those of skill in the art that many modifications can be made with the scope of the invention. For example, discretionary payments could be tied to contributions to a particular project.

What is claimed as the invention is:

1. A method for providing computerized incentive compensation, said method comprising the steps of:
   (a) storing data on income and expenses associated with individual projects in a first database;
   (b) storing data on employees in a second database;
   (c) subtracting expenses from income to produce a balance;
   (d) if the balance exceeds a threshold amount, then using the computer to calculate the amount of incentive compensation as a percentage of the balance; and
   (e) apportioning the amount of incentive compensation among employees.

2. The method as set forth in claim 1, wherein step (b) includes storing data on employees associated with individual projects and step (d) includes the step of calculating the amount of incentive compensation as a first percentage of the balance and as a second percentage of the balance, wherein the amount of the first percentage is apportioned among employees and the amount of the second percentage is apportioned among the employees associated with individual projects.

3. The method as set forth in claim 2 wherein the first percentage is apportioned according to base salary, as indicated by the information in the second database.

4. A computer system for implementing an incentive compensation plan, said computer system comprising:

at least one programmable computer including a relational, incentive compensation database linked to an accounting database and to a personnel database;

wherein one field in the incentive compensation database stores a threshold of profitability and a second field in the incentive compensation database stores a percentage of profit to produce a compensation pool;

wherein the incentive compensation database combines information from the accounting database and the personnel database to calculate the apportionment of said pool among personnel.

5. The computer system as set forth in claim 4 and further comprising:

a second computer linked to said first computer and storing said accounting database.

6. The computer system as set forth in claim 5 and further comprising:

a third computer linked to said first computer and to said second computer; said third computer storing said accounting database.

\* \* \* \* \*